United States Patent
Blyth et al.

Patent Number: 6,142,550
Date of Patent: Nov. 7, 2000

[54] VAN LINER

[75] Inventors: Maurice Blyth; Michael Murden, both of Burlington, Canada

[73] Assignee: 873968 Ontario Limited, Burlington, Canada

[21] Appl. No.: 09/264,830

[22] Filed: Mar. 8, 1999

[30] Foreign Application Priority Data

Apr. 27, 1998 [CA] Canada .................................. 2235997

[51] Int. Cl.[7] .................................................. B62D 33/00
[52] U.S. Cl. ...................... 296/39.2; 296/39.1; 296/214; 296/901
[58] Field of Search ................................. 296/24.1, 39.1, 296/39.2, 39.3, 196, 197, 214, 901

[56] References Cited

U.S. PATENT DOCUMENTS

| | | |
|---|---|---|
| 2,077,650 | 4/1937 | Sweeley et al. . |
| 4,221,427 | 9/1980 | Sentle, Jr. et al. . |
| 4,396,219 | 8/1983 | Cline ...................................... 296/39.2 |
| 4,531,278 | 7/1985 | Boykin ................................... 296/197 |
| 4,830,421 | 5/1989 | Hawelka et al. . |
| 4,893,862 | 1/1990 | Hollenbaugh, Sr. .................... 296/39.1 |
| 4,917,431 | 4/1990 | McDonald .............................. 296/39.1 |
| 4,917,435 | 4/1990 | Bonnett et al. .......................... 296/197 |
| 4,944,612 | 7/1990 | Abstetar et al. ......................... 296/39.2 |
| 5,066,067 | 11/1991 | Ferdows .................................. 296/197 |
| 5,181,815 | 1/1993 | Haberkorn . |
| 5,192,176 | 3/1993 | Roberts . |
| 5,201,868 | 4/1993 | Johnson . |
| 5,271,658 | 12/1993 | Haldenwanger et al. .............. 296/901 |
| 5,314,230 | 5/1994 | Hutchinson et al. ................... 296/197 |
| 5,383,703 | 1/1995 | Irvine, III . |
| 5,586,680 | 12/1996 | Dellby et al. . |
| 5,704,676 | 1/1998 | Hill . |

FOREIGN PATENT DOCUMENTS

| | | |
|---|---|---|
| 701111 | 1/1965 | Canada . |
| 716910 | 8/1965 | Canada . |
| 788808 | 7/1968 | Canada . |
| 874830 | 7/1971 | Canada . |
| 877118 | 8/1971 | Canada . |
| 899801 | 5/1972 | Canada . |
| 912507 | 10/1972 | Canada . |
| 958351 | 11/1974 | Canada . |
| 962061 | 2/1975 | Canada . |
| 1028965 | 4/1978 | Canada . |
| 1070626 | 1/1980 | Canada . |
| 1071554 | 2/1980 | Canada . |
| 1126210 | 6/1982 | Canada . |
| 1141125 | 2/1983 | Canada . |
| 1150650 | 7/1983 | Canada . |
| 1231902 | 1/1988 | Canada . |
| 1261792 | 9/1989 | Canada . |
| 2023643 | 2/1991 | Canada . |
| 2077194 | 3/1991 | Canada . |
| 2042030 | 5/1991 | Canada . |
| 2072968 | 5/1991 | Canada . |
| 2038114 | 9/1991 | Canada . |
| 2052088 | 3/1992 | Canada . |
| 1313354 | 2/1993 | Canada . |
| 1318264 | 5/1993 | Canada . |
| 1323587 | 10/1993 | Canada . |
| 2126110 | 12/1994 | Canada . |
| 2007045 | 6/1996 | Canada . |
| 2054736 | 1/1997 | Canada . |
| WO 90/08088 | 7/1990 | WIPO . |

Primary Examiner—D. Glenn Dayoan
Assistant Examiner—Hilary Gutman
Attorney, Agent, or Firm—Pearne & Gordon LLP

[57] ABSTRACT

There is described a van liner composed of glass reinforced plastic sections that attach together to form an insulated van liner that can be easily assembled, disassembled and transferred.

11 Claims, 5 Drawing Sheets

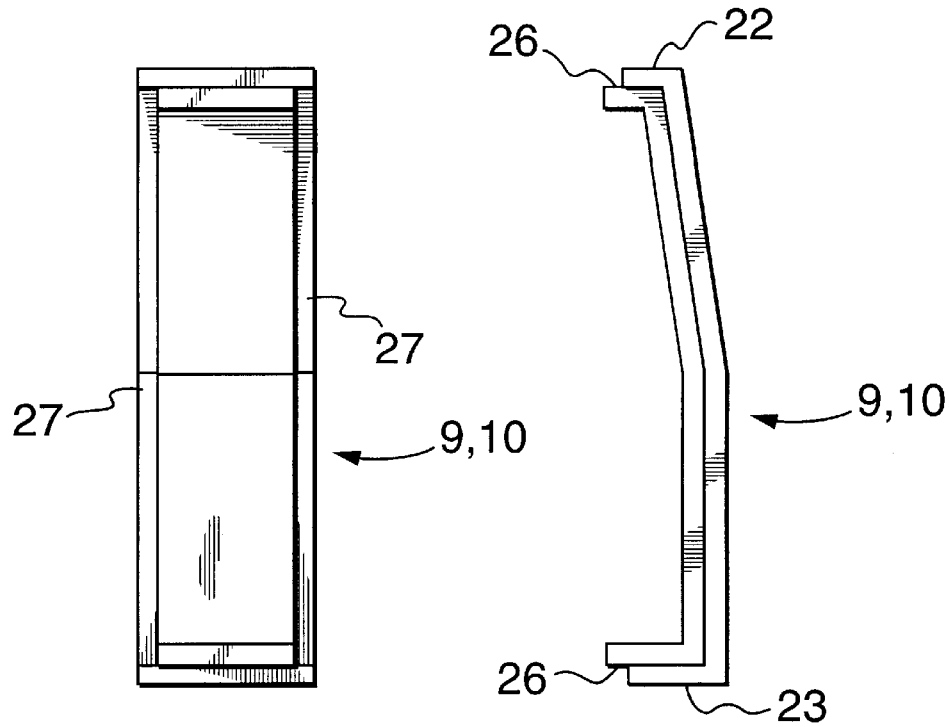
FIG. 2a  FIG. 2b
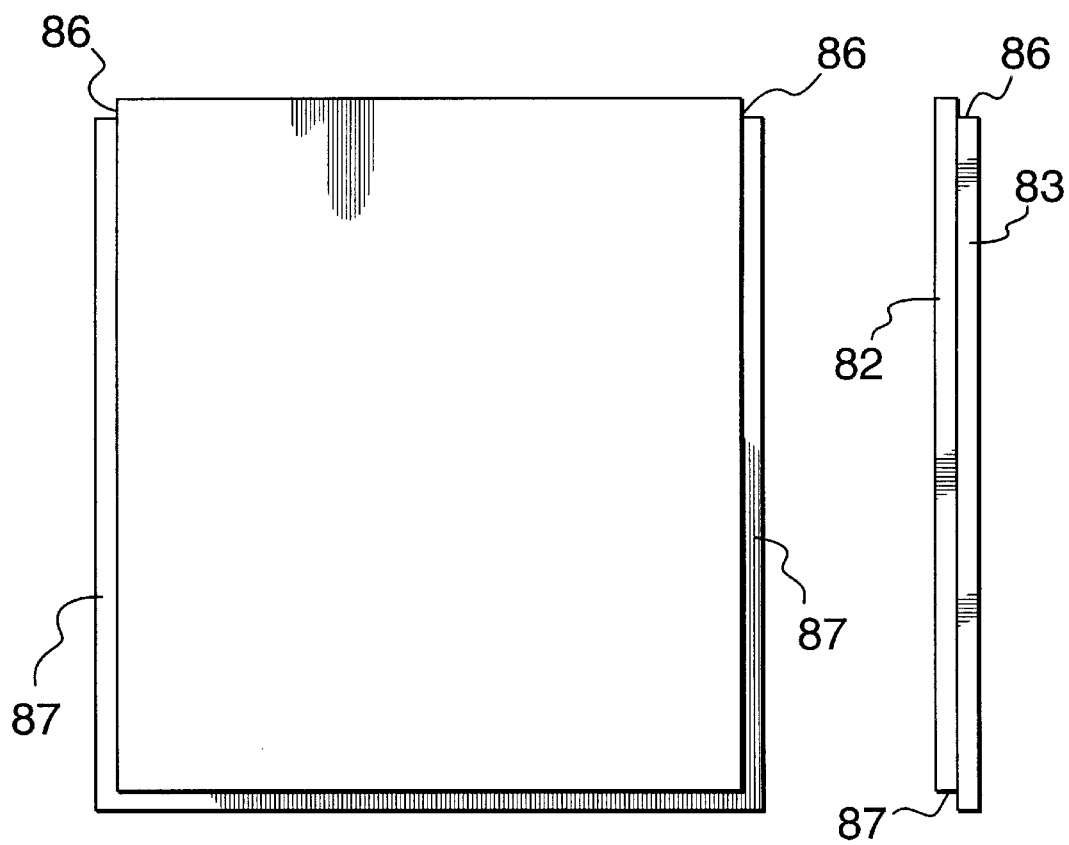
FIG. 3a  FIG. 3b

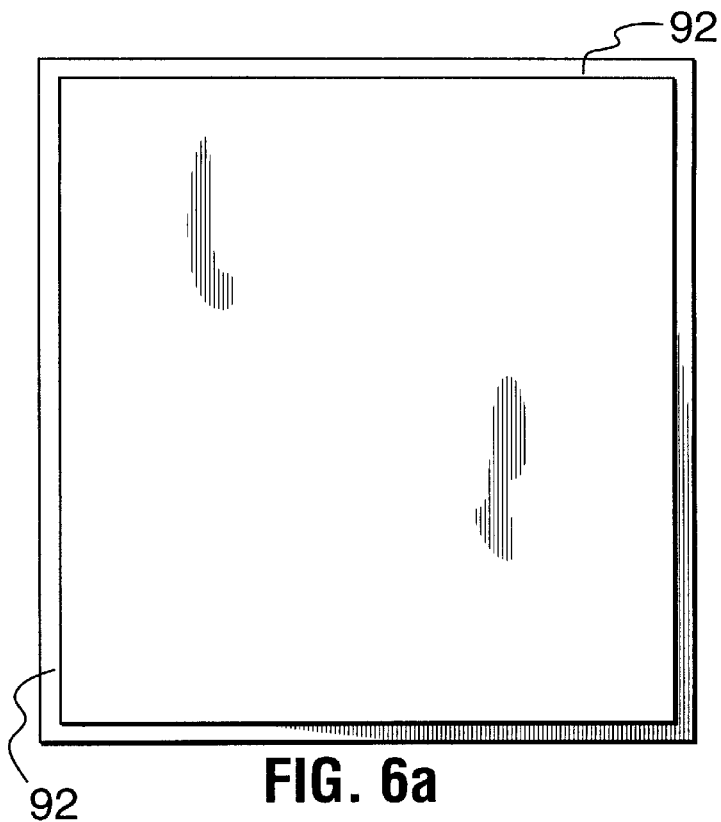
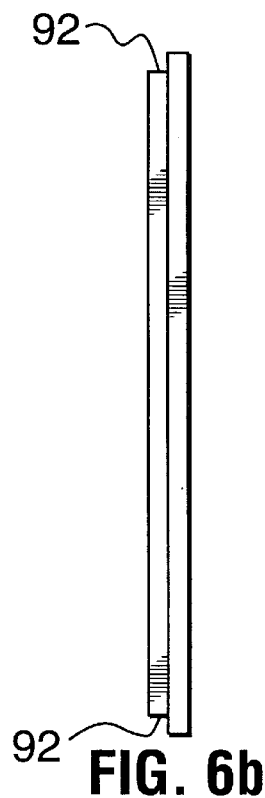
FIG. 6a  FIG. 6b
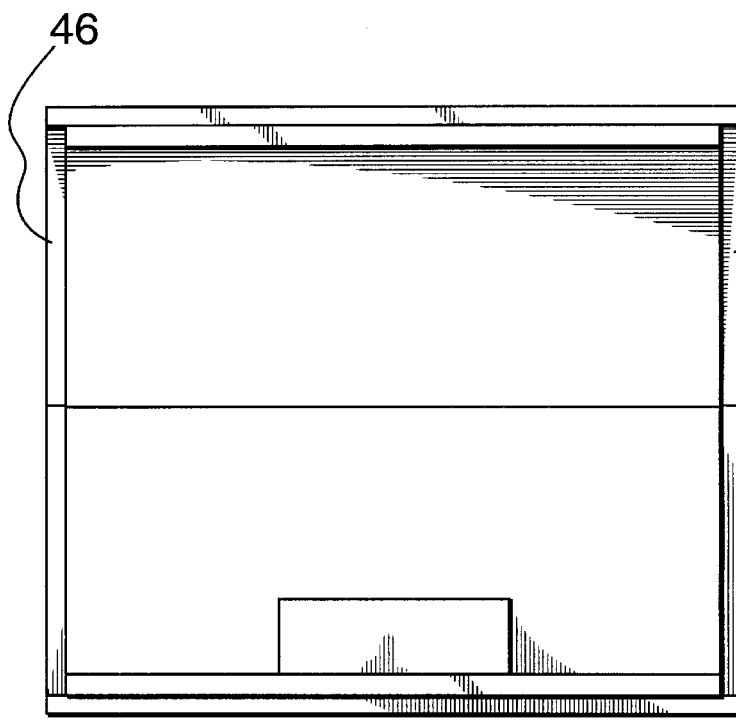
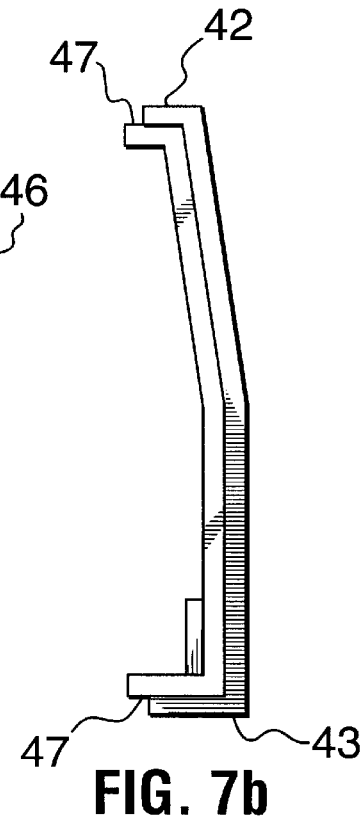
FIG. 7a  FIG. 7b

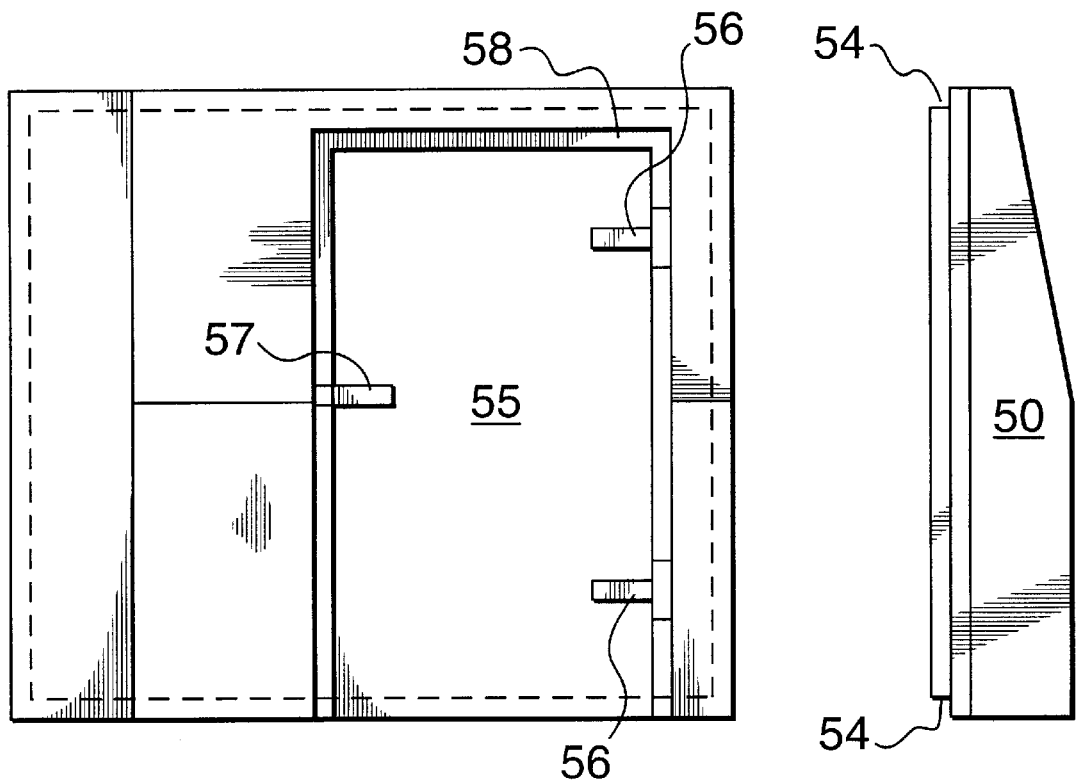
FIG. 8a  FIG. 8b
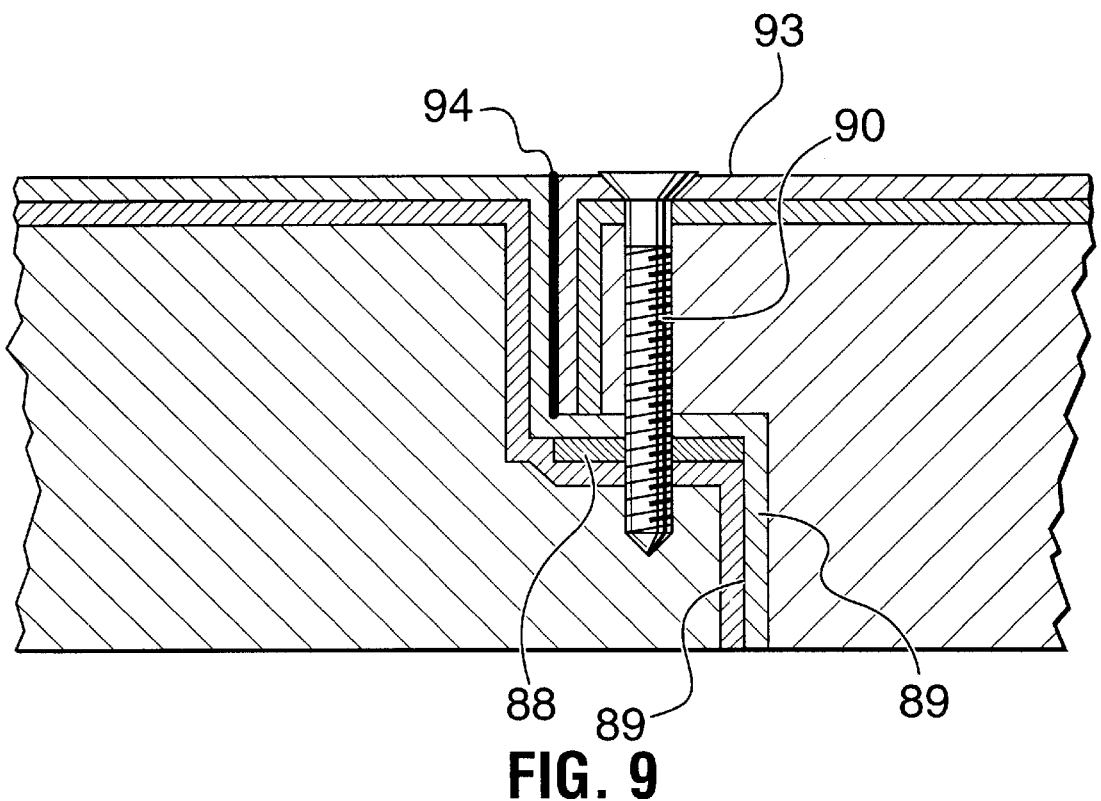
FIG. 9

VAN LINER

FIELD OF THE INVENTION

The present invention relates to van liners. More particularly, the invention relates to insulating, sectional cargo van liners.

BACKGROUND OF THE INVENTION

Manufacturers of perishable goods are concerned with controlling the temperature within the cargo area of vans that are used to transport the perishable goods. They also want to maintain a clean and sanitary area for the transportation of perishable goods and to be able to transport in a cost efficient manner.

The old method of insulating and lining cargo vans involved installing a wooden framework inside the van cargo area into which a block or sprayed foam was placed. The lining was then covered with plywood or sheet glass reinforced plastic (GRP). This method, if carried out properly, was both expensive and permanent.

Therefore there remains a need to create a system for insulating and lining cargo vans that is transferable and inexpensive.

SUMMARY OF THE INVENTION

The present invention provides a van liner used to insulate and maintain the temperature within the cargo area of a transport van. The invention uses contoured glass reinforced plastic sections to create a tightly sealed insulated lining.

It is an object of the present invention to provide a van liner that is an improvement over the prior art.

It is a further object of the present invention to provide a van liner that is composed of sections that can be easily assembled and disassembled and that are transferable between different van models.

According to the present invention, there is provided a cargo van liner, comprising resilient plastic sections, and a means to secure the resilient plastic sections together within the cargo area of the van.

According to another aspect of the present invention, there is a method of providing the interior space of a cargo van with a resilient lining, wherein the method includes the step of providing resilient plastic sections and attaching the sections together within the cargo area of the van.

The cargo van liner of the present invention has many advantages: it is easily and inexpensively assembled and disassembled; it is interchangeable with other cargo vans; it is made of a material that can be easily shaped and contoured to fit within the cargo area of a van; and, it is made from sections that when connected together form a tightly sealed lining, reducing the chance of spillage between the cracks of the sections, thereby keeping the cargo area sanitary and clean.

Other advantages, objects and features of the present invention will be readily apparent to those skilled in the art from a review of the following detailed descriptions of the preferred embodiment in conjunction with the accompanying drawings and claims.

BRIEF DESCRIPTION OF THE DRAWINGS

Preferred embodiments of the present invention will now be described in greater detail and will be better understood when read in conjunction with the following drawings, in which:

FIG. 2a is a side view of the left and right side wall panels and FIG. 2b is a rear end view of the right side wall panel;

FIG. 3a is a top view of the rear floor panel and rear roof panel and FIG. 3b is a tilted side view of the rear floor panel and rear roof panel;

FIG. 6a is a top view of the front floor panel and front roof panel and FIG. 6b is a tilted side view of the front floor panel and front roof panel;

FIG. 7a is a side view of the front drivers side wall and FIG. 7b is a front end view of the front drivers side wall; and FIG. 8a is a side view of the side door frame with side door attached and FIG. 8b is a rear end view of the side door frame with side door attached.

FIG. 9 is a cross-sectional view of the connection between two sections.

DETAILED DESCRIPTION OF THE DRAWINGS

Figure 1:
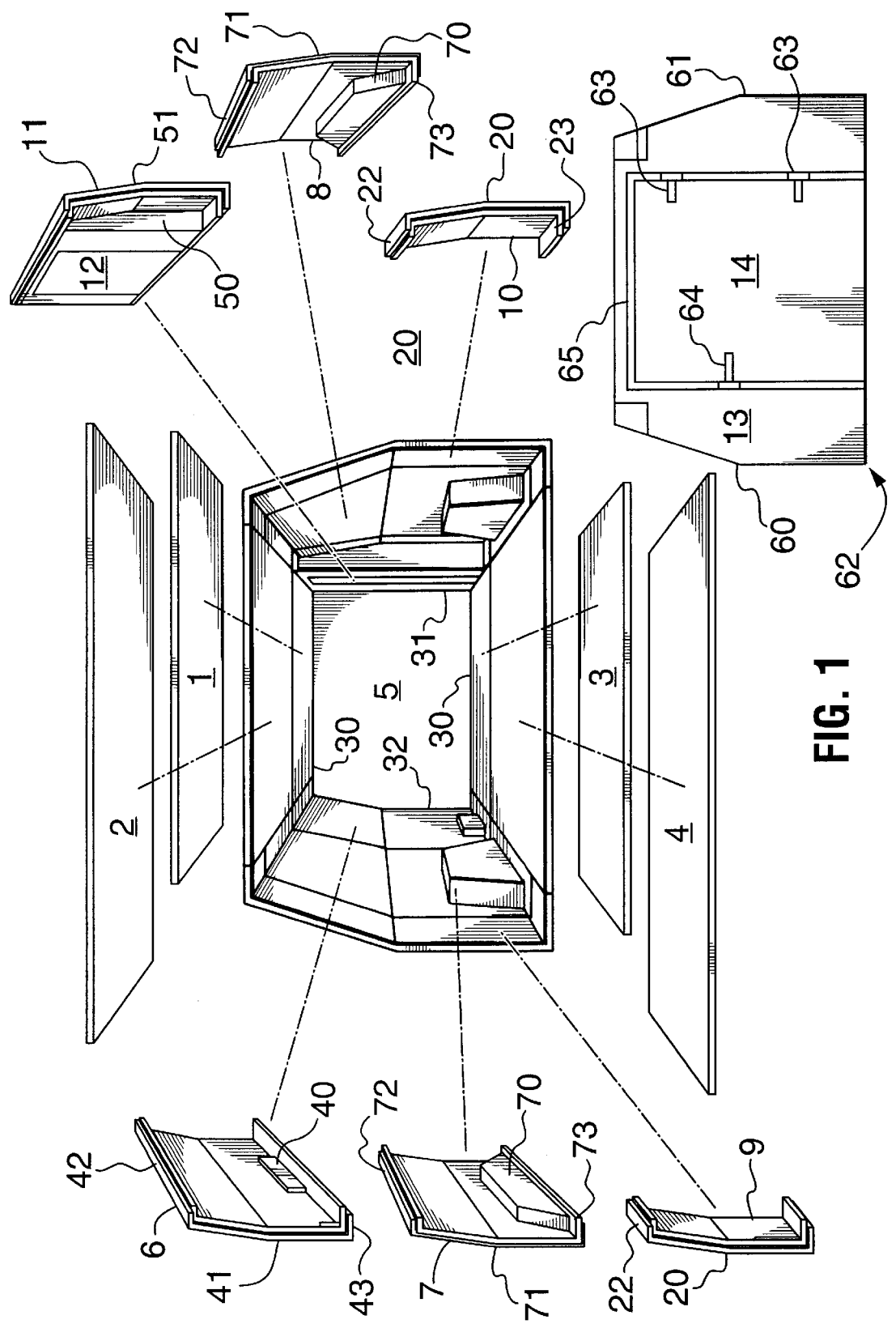
FIG. 1 is an exploded view of the van liner sections.

Referring to FIG. 1, the van liner is composed of sections moulded from GRP (glass reinforced plastic) that when locked together form a completely sealed enclosure 20 within the cargo van. The complete unit is interchangeable between van manufacturers and composes front roof panel 1, rear roof panel 2, front floor panel 3, rear floor panel 4, bulkhead 5, front drivers side wall 6, left wheel arch panel 7, right wheel arch panel 8, left side wall panel 9, right side wall panel 10, side door frame 11, side door 12, rear door frame 13, rear door 14, and black rubber mat (not shown).

In a preferred embodiment the van liner and its sections are shaped and contoured to fit a GMC or Ford van. However, it will be obvious to one skilled in the art that the van liner and its sections could be shaped and contoured to fit other van models when applying the teachings of the present invention.

In the preferred embodiment, the left and right side wall panels 9 and 10 are long, narrow rectangular sections that extend laterally along the rear side wall regions of the van cargo area. The left and right side wall panels 9 and 10 are angled midway along the length of the panels 20 so that the sections can conform snugly to the inside of the van. The left and right side wall panels 9 and 10 contain upper and lower flanges 22, 23 which add stiffness to the left and right side wall panels 9 and 10 between the roof and floor of the van. The left and right side wall panels 9 and 10 are moulded so that flanges 22, 23 have an outside notch 26 so that there is an inside peripheral notch 27 around the left and right side wall panels 9 and 10 (FIGS. 2a and 2b).

The rear door frame 13 is a rectangular section with upper corners 60 angled so that they contour and fit snugly with the sides of the van. The central area of the rear door frame 13 contains an opening into which the rectangular rear door 14 is located. The rear door frame 13 has hinges 63 that are pre-fitted to the rear door 14. The rear door frame 13 is also fitted with a handle and latch 64. The latch 64 ensures that there is free movement about the rear door 14. A jamb 65 is secured around the door to form a seal between the rear door 14 and the rear door frame 13.

The rear floor panel 4 and the rear roof panel 2 are rectangular sections that respectively cover the rear half of the van floor and the rear half of the van roof. The rear floor panel 4 and the rear roof panel 2 are moulded so that the edges of the rear floor panel and rear roof panel are offset creating an outside notch 86 at one end of the rear floor panel 4 and the rear roof panel 2 and an inside peripheral notch 87 around the rear floor panel 4 and the rear roof panel 2 (FIGS. 3*a* and 3*b*).

Figure 4A:
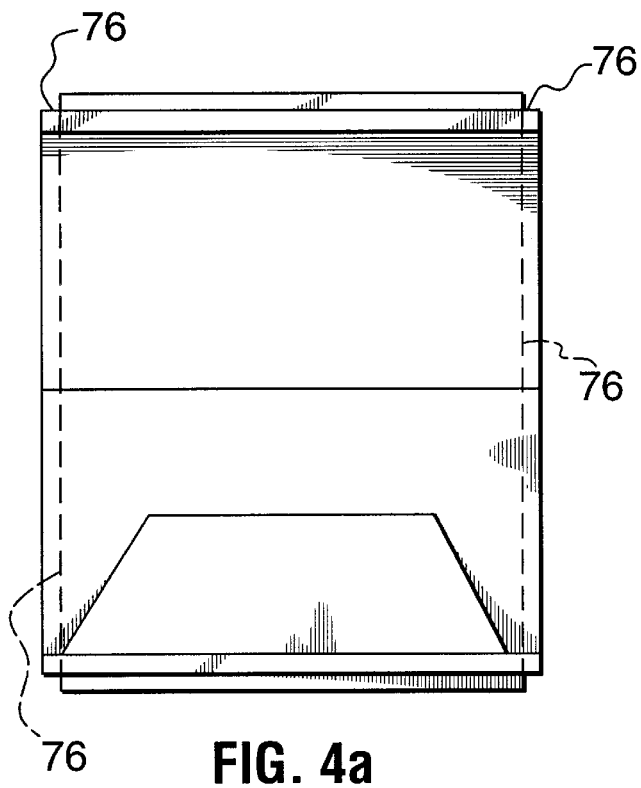
FIG. 4a is a side view of the left and right wheel arch panels and FIG. 4b is a rear end view of the right wheel arch panel.
Figure 4B:
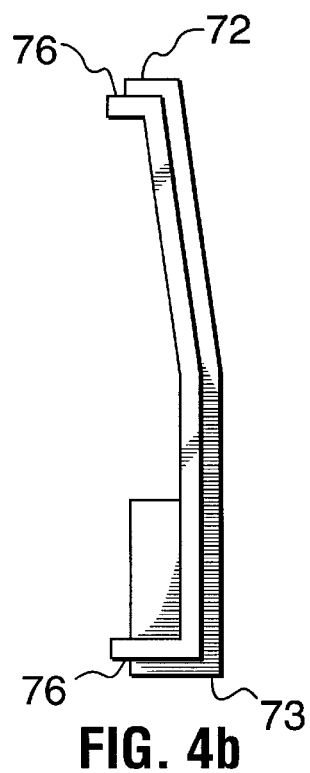

The left and right wheel arch panels 7 and 8 are rectangular sections that extend laterally along the side wall regions of the van immediately forward of the left and right side wall panels 9 and 10. The left and right wheel arch panels 7 and 8 contain upper and lower flanges 72, 73 which add stiffness to the left and right wheel arch panels 7 and 8 between the roof and floor of the van. The left and right wheel arch panels 7 and 8 also include a wheel covering 70 that protrudes upward from the lower flange 73 of the wheel arch panels 7, 8, covering almost the entire area of the lower flange 73. The wheel arch panels 7, 8 are bent at an angled midway through the length of the wheel arch panels 71 so that the wheel arch panels 7, 8 can conform snugly to the inside lining of the van. The wheel arch panels 7, 8 are moulded with an outside notch 76 at the ends and around the periphery of the wheel arch panels 7, 8 (FIGS. 4*a* and 4*b*).

Figure 5A:
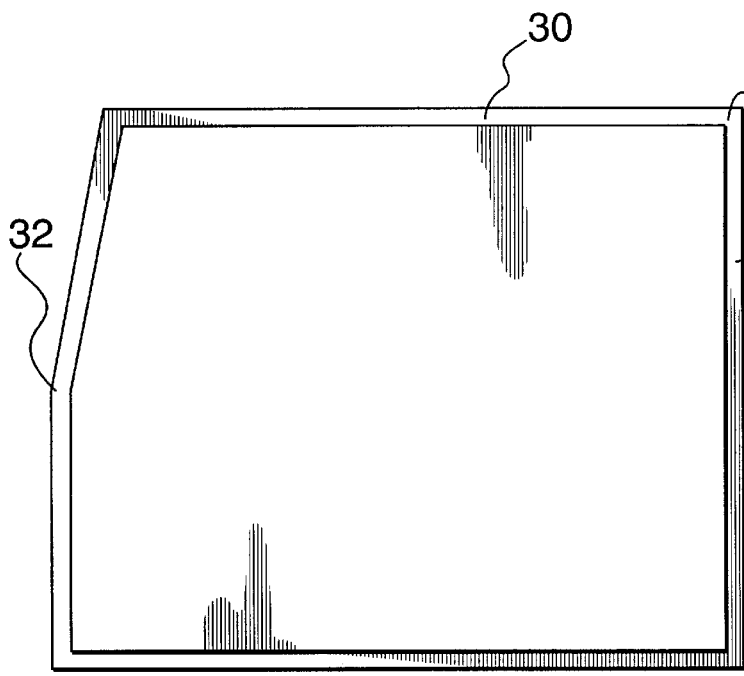
FIG. 5a is a rear view of the bulkhead and FIG. 5b is a right side view of the bulkhead.
Figure 5B:
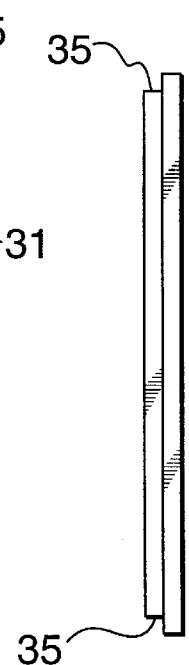

The bulkhead 5 is assembled with long edges 30 meeting the front floor panel 3 and the front roof panel 1 and long edge 31 meeting the passenger side of the van. The shape of the bulkhead 5 matches the inner profile of the van; in the embodiment illustrated, this is a rectangle with one straight side that abuts the wall with side door and one angled side that abuts the wall of the van. The bulkhead 5 has end 32 angled so that it contours snugly with the driver's side of the van. The bulkhead 5 is moulded with an inside peripheral notch 35 (FIGS. 5*a* and 5*b*).

The front floor panel 3 and front roof panel 1 are rectangular sections that respectively cover the upper half of the floor and roof of the van, immediately forwardly of the rear floor panel 4 and rear roof panel 2. An inside peripheral notch 92 is moulded around the front floor panel 3 and front roof panel 1 (FIGS. 6*a* and 6*b*).

The front driver's side wall 6 is a generally rectangular section that extends laterally along the side wall regions of the van, immediately forwardly of the left wheel arch panel 7. The front drivers side wall 6 includes upper and lower flanges 42, 43 which add stiffness to the front driver's side wall 6 between the roof and floor of the van. The front drivers side wall 6 also includes a gas filler pipe cover 40 that protrudes upward from the lower flange 43 of the front driver's side wall 6. The front drivers side wall 6 is angled midway along the length of the panel 41 so that the section can conform snugly to the inside lining of the van. The flanges 42, 43 have an outside notch 47 and an inside peripheral notch 46 is moulded around the drivers side wall 6 (FIGS. 7*a* and 7*b*).

The side door frame 11 is a rectangular frame that extends laterally along the passenger side wall of the van, immediately forward of the right wheel arch panel 8. The side door frame is thicker than the other van liner sections and configured to maintain a complete enclosure within the cargo area of the van while providing outside access through the side door of the van. The side door frame 11 therefore protrudes inwardly from the passenger side wall. The width of the side door frame 11 is the same as the width of the upper flange 72 of the right wheel arch panel 8 so that the side door frame 11 remains in alignment with the right wheel arch panel 8. The side door frame 11 includes a side 50 angled midway along its length 51 so that the side door frame 11 can conform to the inside lining of the van (FIG. 8*b*).

The side door frame 11 is moulded with an inner peripheral notch 54. The centre of the side door frame 11 contains an opening into which a rectangular side door 12 is located. The side door frame 11 has hinges 56 that are pre-fitted to the side door 12 (FIG. 8*a*). The side door frame 11 is also fitted with a handle and latch 57. The latch 57 ensures that there is free movement about the side door 12. A jamb 58 is secured around the door to form a seal between the side door 12 and the side door frame 11.

In a preferred embodiment, the outside of the moulded GRP sections of the van liner are made from 2½" high density extruded polystyrene foam. The inner surface of the van liner has a bright white Gel coat finish stiffened with two layers of 1½ oz chopped glass mat (three layers in floor sections) that are saturated with catalyzed resin.

While the sections of the described embodiment are made from a single mould, it will be apparent to one skilled in the art that the sections could be made efficiently from two moulds, providing layers of different sizes that when sealed together create the flanges and the inside or outside notches of the flanges described herein.

To install the van liner into the cargo area of the van, the installer should remove the floor mat, wheel jack, bracket and floor mouldings of the van along with the passenger seat. The drivers seat and back rest are moved forward and the interior light is removed and the wiring is extended by at least 18".

As the first step to installation, the installer attaches the left and right side wall panels 9 and 10 to the rear door frame 13 by resting the side walls of the rear door frame 13 in the inside peripheral notch 27 of the side wall panels 9, 10. The installer enters the side door opening of the van, placing the connected side wall panels 9, 10 and rear door frame 13 at the rear door opening of the van. The second unit to be introduced through the side door opening of the van is the rear floor panel 4 which is positioned so that the inside peripheral notch 87 of the rear floor panel 4 is under the rear door frame 13. The rear door frame 13 is then screwed into the rear floor panel 4. The outside notch 26 created at the bottom flange of the side wall panels 9,10 is secured to the inside peripheral notch 87 of the rear floor panel 4.

FIG. 9 is representative of the securing mechanism that is used between each of the sections. Galvanized steel strips 88 are embedded in the glass mat layer 89 of the inside peripheral notch. The outside notch of the connecting flange has a pre-drilled hole fitted for a suitable screw 90. The screw 90 is secured into the pre-drilled hole. At the same time, the base of the screw 90 is embedded into the galvanized strip 88 of the inside peripheral notch, securing the sections together.

As the second step to installation, the wheel arch panels 7, 8 are positioned forward of the left and right side wall panels 9 and 10 so that the outside peripheral notches 76 of the wheel arch panels 7, 8 fit with the inside peripheral notch 27 of the side wall panels 9, 10. The wheel arch panels 7, 8 are then screwed to the side walls panels 9, 10 at the peripheral overlap region.

The rear roof panel 2 is loaded through the side door opening of the van and slid into position on top of the side wall panels 9, 10 until its edge meets with the rear door frame 13. The outside peripheral notches 76 of the wheel arch panels 7, 8 are secured to the inside peripheral notch 87 of the rear roof panel 2 and the inside peripheral notch 87 of the rear floor panel 4 with screws.

When fully assembled the rear assembly of the van liner is pushed as far to the rear of the van as possible. The front bulkhead 5 is then slid through the side door opening and rested flat against the back of the van seats.

The front floor panel 3 is placed forward of the rear floor panel 4 and the inside peripheral notch 92 of the front floor panel 3 is slipped underneath the outside peripheral notch 86 of the rear floor panel 4 and the rear floor panel 4 is screwed to the front floor panel 3. The outside notch 47 of the front drivers side wall panel 6 fits securely within the inside peripheral notch 92 of the front floor panel 3, allowing the front drivers side wall panel 6 to be secured to the front floor panel 3 with screws. Similarly the outside peripheral notches 76 of the wheel arch panels 7, 8 fit within the inside peripheral notch 92 of the front floor panel 3, enabling the wheel arch panels 7,8 to be secured to the front floor panel 3 with screws.

The inside peripheral notch 54 of the side door frame 11 is secured to the inside peripheral notch 92 of the front floor panel 3 with screws. The inside peripheral notch 54 of the side door frame is also secured to the outside peripheral notch 76 of the right wheel arch panel 8. The front roof panel 1 is slid forward so that the inside peripheral notch 92 of the front roof panel 1 fits underneath the outside notch 86 of the rear roof panel 2. The rear roof panel 2 is then screwed into the front roof panel 1 and the outside peripheral notch 47 created by the upper flange of the front drivers side wall panel 6 is secured to the inside peripheral notch 92 of the front roof panel 1 with screws. Similarly the inside peripheral notch 54 of the side door frame 11 is secured to the inside peripheral notch 92 of the front roof panel 1 with screws.

The outside peripheral notches 92 of the front roof panel 1 and the front floor panel 3, and the outside peripheral notch 46 of the front drivers side wall panel 6 are secured to the outside peripheral notch 35 of the bulkhead 5 with screws.

The rear door 14 is placed in the rear door frame 13 and the hinges 63 are screwed to the rear door frame 13. The latch 64 is drilled to the rear door 14 with screws to ensure free movement about the rear door 14. The jamb 65 is placed in position around the rear door 14 between the rear door 14 and the rear door frame 13.

Similarly, the side door 12 is placed in the side door frame 11 and the hinges 56 are screwed to the side door frame 11. The latch 57 is drilled to the side door 12 with screws to ensure free movement about the side door 12. The jamb 58 is placed in position around the side door 12 between the side door 12 and the side door frame 11.

When all sections of the van liner are secured in place within the cargo area of the van, the installer can use sealant 94 between the sections (see FIG. 9) to create the completely sealed enclosure 20.

Numerous modifications, variations and adaptations may be made to the particular embodiments of the invention described above without departing from the scope of the invention, which is defined in the claims.

The embodiments of the invention in which an exclusive property or privilege is claimed are defined as follows:

1. A cargo van liner for a van having a floor and a roof, comprising:
    resilient plastic sections including roof panels, floor panels, side wall panels, and door panels;
    the roof panels including a front roof panel and a rear roof panel;
    the floor panels including a front floor panel and a rear floor panel;
    the side wall panels including a bulkhead panel, a front drivers side wall Panel. a left wheel arch panel, a right wheel arch panel, a left side wall panel, a right side wall panel, a side door frame panel, a rear door frame panel;
    the door panels including a side door panel, and a rear door panel; and
    a means to secure the resilient plastic sections together within the cargo area of the van.

2. A cargo van liner as defined in claim 1, each said section having an inner surface, and an outer surface, and a plurality of perimeter edges, each said edge having a generally squared edge notch extending the length thereof along the inner or the outer surface of said section, wherein notches along the edges of adjacent sections overlap.

3. A cargo van liner as defined in claim 1, wherein the side wall panels include upper and lower flanges that rest the side wall panels between the floor and roof of the van.

4. A cargo van liner as defined in claim 2, wherein the side wall panels include upper and lower flanges having edge notches and the edge notches of the floor and roof panels rest underneath the edge notches of the flanges of the side wall panels.

5. A cargo van liner as defined in claim 1, wherein the resilient plastic sections are further composed of galvanized steel strips located around the edges of the sections, allowing for drilling and insertion of screws for assembly.

6. A cargo van liner as defined in claim 1, wherein the outside of the resilient plastic sections is composed of a high density extruded polystyrene foam and the inner surface of the resilient plastic sections is composed of a gel coat finish stiffened with layers of chopped glass mat saturated with catalyzed resin.

7. A method of providing the interior space of a cargo van with a resilient lining, wherein the method includes the steps of:
    providing resilient plastic sections; and
    attaching the resilient plastic sections together within the cargo area of the van;
    wherein the resilient plastic sections include roof panels, floor panels, side wall panels, and door panels; the roof panels include a front roof panel and a rear roof panel; the floor panels include a front floor panel and a rear floor panel; the side wall panels include a bulkhead panel, a front driver's side wall panel, a left wheel arch panel, a right wheel arch panel, a left side wall panel, a right side wall panel, a side door frame panel, and a rear door frame panel; and the door panels include a side door panel, and a rear door panel.

8. A method as defined in claim 7, wherein the resilient plastic sections are provided with an inner surface and an outer surface, and a plurality of perimeter edges, each said edge having a generally squared notch extending the length thereof along the inner or outer surface of said section.

9. A method as defined in claim 8, wherein the step of attaching the sections together includes overlapping the notched edges of adjacent sections.

10. A method as defined in claim 8, wherein the side wall panels include upper and lower flanges having peripheral notches and the floor and roof panels are assembled within the cargo area of the van so that the notched edges of the floor and roof panels rest underneath the peripheral notches of the flanges of the side wall panels.

11. A method as defined in claim 8, wherein the sections are secured together using galvanized strips embedded in the notched edges of the sections and screws are drilled into the holes of the galvanized strips.

* * * * *